United States Patent [19]

Washington

[11] 4,205,358
[45] May 27, 1980

[54] GROUND FAULT PROTECTION SYSTEM

[75] Inventor: Forest L. Washington, Plainville, Conn.

[73] Assignee: General Electric Company, New York, N.Y.

[21] Appl. No.: 955,076

[22] Filed: Oct. 26, 1978

[51] Int. Cl.² ............................................... H02H 3/28
[52] U.S. Cl. ........................................ 361/44; 361/45
[58] Field of Search ............................. 361/42, 44–50; 307/311

[56] References Cited

U.S. PATENT DOCUMENTS

| | | | |
|---|---|---|---|
| 3,764,853 | 10/1973 | Beachley, Jr. | 361/44 |
| 3,925,709 | 12/1975 | Mitchell et al. | |
| 3,953,767 | 4/1976 | Ahmed | 361/44 |
| 4,044,395 | 8/1977 | Eckart | 361/44 |

Primary Examiner—Harry E. Moose, Jr.
Attorney, Agent, or Firm—Robert A. Cahill; Walter C. Bernkopf; Philip L. Schlamp

[57] ABSTRACT

A sensor develops a ground fault signal in response to a ground fault on a power distribution circuit, which signal is processed by a signal processor of a conventional, residential ground fault circuit interrupter (GFCI) pursuant to developing a trip signal resulting in energization of a light emitting device. The light signal emitted by this device triggers a solid state, light activated switch to complete an energization circuit for a solenoid acting to shunt trip a power circuit breaker operating to interrupt the distribution circuit.

6 Claims, 1 Drawing Figure

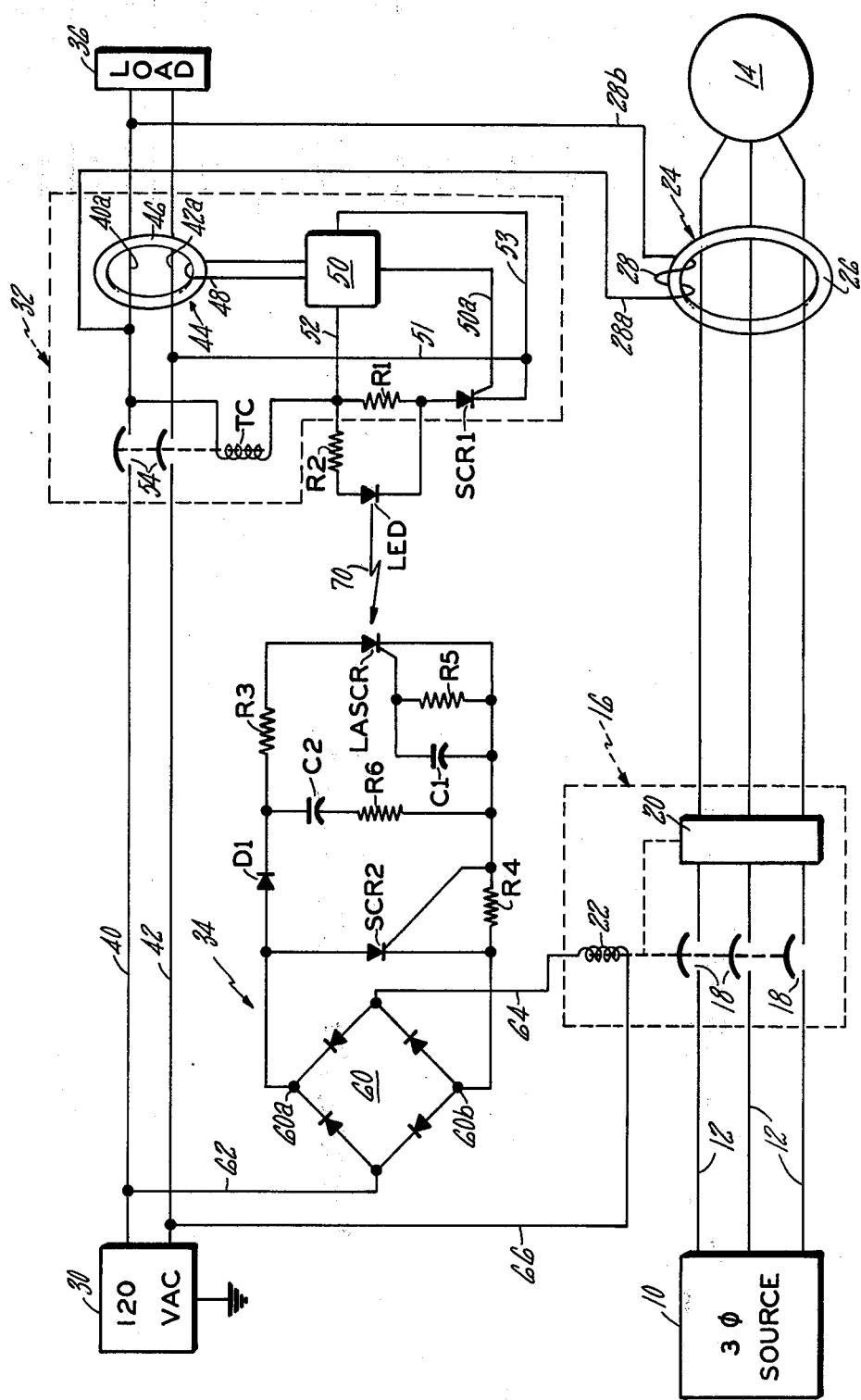

GROUND FAULT PROTECTION SYSTEM

BACKGROUND OF THE INVENTION

Commonly assigned, copending application Ser. No. 831,709, filed Sept. 9, 1977, discloses a system for protecting a power distribution circuit against ground faults wherein a conventional, residential ground fault circuit interrupter (GFCI) acts in response to a fault signal developed by a ground fault sensor associated with the power circuit to effect closure of a normally open, accessory mechanical switch wired into an energization circuit for a shunt trip solenoid of a power circuit breaker protecting the power circuit. The resulting energization of this solenoid trips the power circuit breaker contacts open to interrupt the power distribution circuit, clearing the ground fault condition thereon. For certain GFCI device constructions, the physical adaption thereto of a normally open, accessory mechanical switch is not structurally convenient. This is particularly so in the case of GFCI devices in receptacle configurations.

It is accordingly an object of the present invention to provide a ground fault protection system of the type discloses in the above-noted copending application, wherein the GFCI device is adapted to effect closure of a normally open solid state, i.e., non-mechanical, accessory switch pursuant to shunt tripping a power circuit breaker.

An additional object is to provide a ground fault protection system of the above character, wherein the solid state accessory switch is effectively electrically isolated from the GFCI device for electrical noise immunity.

A further object is to provide a ground fault protection system of the above character, wherein the accessory switch is a light activated, solid state switch optically coupled with the GFCI device.

Other objects of the invention will in part be obvious and in part appear hereinafter.

SUMMARY OF THE INVENTION

In accordance with the present invention, there is provided a system for affording protection to a power distribution circuit against the hazards of ground faults, wherein the system advantageously utilizes the principle operating components of a ground fault circuit interrupter (GFCI) as mass produced for low voltage residential-type circuits in providing human shock protection. As is well known, such GFCI devices utilize a differential current transformer to sense imbalances in the currents flowing to and returning from a load, as would be occasioned by leakage current returning to the source through an unintended ground path. The differential current transformer develops in its secondary winding a ground fault signal, proportional to this leakage current, which is processed by electronic signal processing circuitry, and, if of a predetermined magnitude in duration, a trip signal issues to trigger a thyristor pursuant to initiating a ground fault trip function.

To implement such a GFCI device in a ground fault protection system for a high voltage power distribution circuit, a ground fault sensor is coupled with the load current carrying conductors of the power circuit for developing a ground fault current signal indicative of a ground fault on the power circuit. This ground fault current signal is applied to the GFCI device in a manner so as to create a current imbalance sensible by the differential current transformer. The resulting ground fault signal produced in the differential current transformer secondary winding is processed by the electronic signal processing circuitry pursuant to issuing a trip signal effective in triggering a thyristor into conduction.

In accordance with the present invention, conduction of this thyristor draws energizing current through a light emitting device which responds by emitting a light signal. A normally open solid state, light activated switch is optically coupled with this light emitting device and is triggered into conduction by the light signal emitted thereby to complete an energization circuit for a shunt trip solenoid. Energization of this solenoid acts to shunt trip a power circuit breaker included in the power distribution circuit, whereupon the power circuit is interrupted to clear the ground fault thereon.

The invention accordingly comprises the features of construction and arrangement of parts which will be exemplified in the construction hereinafter set forth and the scope of the invention will be indicated in the claims.

For a better understanding of the nature and objects of the invention, reference should be had to the following detailed description taken in conjunction with the accompanying drawing, in which the sole FIGURE is a circuit diagram, partially in block form, of a ground fault protection system constructed in accordance with the present invention.

DETAILED DESCRIPTION

Turning to the drawing, the ground fault protection system of the present invention is depicted in its application to a high voltage, industrial-type electrical power distribution circuit including a grounded neutral source 10 supplying three-phase power over phase or line conductors 12 to a load 14. Included in this distribution circuit is a conventional, three-pole power circuit breaker, generally indicated at 16, having separable contacts 18 connected in series with each line conductor. The circuit breaker also includes, as diagrammatically illustrated in the drawing, a trip unit 20 of known construction which is responsive to the levels of current flowing in the three line conductors for effecting automatic opening of the breaker contacts under overload and short circuit conditions.

Operatively associated with the circuit breaker 16, in a well-known manner, is a shunt trip solenoid 22. As is well understood in the art, a shunt trip solenoid, in its adaptation to a power circuit breaker, is normally de-energized, but when it is desired to trip the breaker, its coil is energized. Its plunger is magnetically attracted from an inactive to an actuated position, in the process striking a latch associated with the trip unit. The latch releases the breaker mechanism which operates under the power of mechanism springs to abruptly open the breaker contacts 18.

To detect a ground fault on the power distribution circuit, an appropriate sensor, generally indicated at 24, is utilized. This sensor may, as illustrated, take the form of a zero sequence transformer having a toroidal core 26 through which the line conductors 12 pass as single turn primary windings. As long as the vectorial sum of the currents flowing in the three line conductors equal zero, the net flux induced in core 26 is also zero, and no voltage is induced in a multi-turn secondary winding 28 wound on the core. On the other hand, if a ground fault should exist on the distribution circuit, the vectorial sum of the currents in the line conductors is no longer zero, and a ground fault signal voltage is induced in secondary winding 28.

A suitable control power source, such as a 120 volt AC source 30, is utilized pursuant to the present invention to power a ground fault circuit interrupter (GFCI), generally indicated at 32, a shunt trip solenoid 22 through a normally non-conductive, solid state, light actuated switch, generally indicated at 34, and, optionally, a secondary load 36. The line and grounded neutral sides of source 30 are respectively connected by a line conductor 40 and a neutral conductor 42 to GFCI device 32 and, depending on the application, through to load 36. Included in the GFCI device is a differential current transformer, generally indicated at 44, which comprises a toroidal core 46 through which the line and neutral conductors pass as single-turn primary windings 40a and 42a, respectively. Wound on this core is a multi-turn secondary winding 48 in which is developed a ground fault signal proportional in magnitude to any imbalance in the currents flowing in primary windings 40a, 42a, which ground fault signal is applied to an electronic signal processing circuit 50. If this ground fault signal exceeds a predetermined magnitude and duration, a trip signal is issued over lead 50a to the gate of a thyristor, such as silicon controlled rectifier SCR1. The anode of this thyristor is connected to line conductor 40 through a resistor R1 and a trip coil TC, while the cathode thereof is connected via lead 51 to neutral conductor 42. Leads 52 and 53 connect signal processor 50 across the series combination of resistor R1 and thyristor SCR1 so as to receive operating power from source 30. The current drawn through trip coil TC to power the signal processor is well below the trip coil actuating level.

Also included in GFCI device 32 is a pair of contacts 54 connected in series with the line and neutral conductors of the control power circuit. These contacts are operatively coupled with the trip coil TC such that upon triggering of thyristor SCR1 into conduction by the trip signal issuing from signal processor 50, sufficient current is drawn through the trip coil to cause it to act as a trip solenoid in precipitating the opening of contacts 54 pursuant to interrupting the control power circuit. While two sets of contacts 54 are shown, it will be appreciated that the GFCI device may include but a single set operating to interrupt the control power circuit by opening only the line side thereof. The foregoing description of GFCI device 32 is typical of conventional GFCI devices utilized in residential circuitry to provide personnel protection against the hazards of ground faults.

To render GFCI device 32 responsive to ground faults on the power distribution circuit, secondary winding 28 of zero sequence transformer 24 is connected via leads 28a, 28b across one of the primary windings of the GFCI differential current transformer 44, primary winding 40a in the illustrated embodiment. It is thus seen that when a ground fault signal voltage is induced in secondary winding 24, there is produced a current flow in primary winding 40a which will create a current imbalance in GFCI differential current transformer 44. The resulting ground fault signal induced in secondary winding 48 is then processed by signal processor 50 pursuant to issuing a trip signal of lead 50a. It then remains to translate this trip signal into actuation of shunt trip solenoid 22 in order to trip contacts 18 of power circuit breaker 16 open and thereby interrupt the power circuit, clearing the ground fault thereon.

In accordance with the present invention, GFCI device 32 operates in response to the issuance of a trip signal by signal processor 50 to effect the energization of a light emitting element, such as a light emitting diode LED. The resulting light signal, indicated at 70, emitted by this light emitting diode is optically coupled to light actuated, solid state switch 34 which goes into conduction to draw energizing current from source 30 for trip solenoid 22 to effect shunt tripping of power circuit breaker 16. To achieve selective energization of light emitting diode LED, it is connected in series with a current limiting resistor R2 across resistor R1 of GFCI device 32. It is seen that when the trip signal on lead 50a from signal processor 50 triggers thyristor SCR1 into conduction, current is drawn through resistor R1, and the resulting voltage developed thereacross produces an energizing current flow through the light emitting diode, which energizing current is limited to an appropriate level by resistor R2.

The solid state switch 34 activated by light signal 70 includes, as seen in the drawing, a full-wave rectifying diode bridge, generally indicated at 60. One input terminal of this bridge is connected via a lead 62 to line conductor 40 of the control power circuit, while its other input terminal is connected via lead 64 to one end of shunt trip solenoid 22. The other end of this trip solenoid is connected via lead 66 to neutral conductor 42 of the control power circuit. The positive voltage output terminal 60a of bridge 60 is connected to the anode of a thyristor, such as a silicon controlled rectifier SCR2. The cathode of this thyristor is returned to the negative voltage output terminal 60b of this bridge. The anode of thyristor SCR2 is connected via a diode D1 and a resistor R3 to the anode of a solid state light activated element, such as a light activated silicon controlled rectifier LASCR. The cathode of this light activated element is connected to the negative voltage output terminal 60b of bridge 60 through a resistor R4. Light activated element LASCR is optically coupled with light emitting diode LED so as to respond to light signal 70 emitted by the latter. The gate of this light activated element is connected to its cathode via the parallel combination of a capacitor C1 and a resistor R5. The resistance of resistor R5 is selected to establish a desired sensitivity of the light activated element to light signal 70, while the capacitance of capacitor C1 is selected to render the light activated element relatively insensitive to abrupt changes in voltage impressed across its anode and cathode. The gate of thyristor SCR2 is connected to the junction between resistor R4 and the cathode of light activated element LASCR. Finally, the series combination of a resistor R6 and a capacitor C2 is connected between the junction of diode D1 with resistor R3 and the junction of resistor R4 with the cathode of light activated element LASCR.

Under quiescent conditions, thyristor SCR2 and light activated element LASCR are essentially non-conductive. Capacitor C2 is in a fully charged condition, having been charged to the voltage appearing across the bridge output terminals by charging current flowing through diode D1, resistor R6, and resistor R4. This charging current is limited by resistor R6 to a level well below the activating level of trip solenoid 22. Moreover, this charging current is sufficiently limited so as to be incapable of developing sufficient gate voltage across resistor R4 to trigger thyristor SCR2 into conduction. It will be appreciated that once capacitor C2 is fully charged, essentially no current is conducted through solid state switch 34 to trip solenoid 22.

When light signal 70, ossasioned by a ground fault on a power distribution circuit, is emitted by light emitting diode LED, light activated element LASCR is triggered into conduction to conduct current between the bridge output terminals through diode D1, resistor R3 and resistor R4. This current also flows through trip solenoid 22, however, due to the limited current carrying capability of the light activated element LASCR, it is insufficient to effect reliable actuation of the trip solenoid. The current drawn by the light activated element however is sufficient to develop the requisite gate voltage across resistor R4 to trigger thyristor SCR2 into conduction. There is thus imposed a virtual short circuit across the bridge output terminals through which is conducted sufficient current to activate trip solenoid 22. Since the voltage appearing across the bridge output terminals is a full-wave rectified voltage, thyristor SCR2 will have the propensity of reverting to its non-conductive state when the bridge output voltage goes to zero at the conclusion of each half cycle. In order that the energizing current for trip solenoid 22 to be of sufficient duration to reliably effect its actuation in tripping the power circuit breaker, thyristor SCR2 must be triggered back into conduction as the full-wave rectified voltage across the bridge output terminals starts into each half cycle. The only way this can be achieved is by developing the requisite gate voltage across resistor R4. Should light signal 70 disappear before solenoid 22 has been energized for a sufficient duration to effect its actuation, the light activated element LASCR would revert to its non-conductive state and thus be incapable of drawing current from bridge 60 pursuant to developing a gate triggering voltage across R4 to trigger thyristor SCR2 into conduction at the beginning of a half cycle of the full-wave rectified voltage across the bridge output terminals. Under these circumstances, the trip solenoid 22 would no longer be energized and shunt tripping of the power breaker 16 would not be achieved.

In accordance with the present invention, solid state switch 34 is uniquely constructed to prevent this situation of occurring. Specifically, capacitor C2, as previously noted, is charged to the voltage across the bridge output terminals over a charging current path including diode D1 and resistors R6, R4 while the solid state switch is in its quiescent condition with thyristor SCR2 non-conductive. When the light activated element LASCR is triggered into conduction by light signal 70, capacitor C2 begins discharging through resistor R3, the light activated element and resistor R6; this discharging current serving to maintain the light activated element in its conductive state regardless of whether or not light signal 70 persists. Diode D1 prevents this capacitor from discharging through thyristor SCR2. With the conduction of light activated element LASCR being maintained by this discharge current, it remains capable of drawing current from bridge 60 through resistor R4 as the full-wave rectified voltage across the bridge output terminals starts into each half cycle. The resulting gate voltage developed across this resistor insures that thyristor SCR2 is retriggered. It has been found that by selecting the values of capacitor C2 and resistors R3 and R4 such that the discharge current maintains the light activated element LASCR in its conductive state for at least 100 milliseconds after the initial triggering of thyristor SCR2, the requisite energization duration of trip solenoid 22 to effect its actuation in tripping power breaker 16 is achieved.

It will be noted from the drawing that GFCI device 32 will also respond to any downstream ground fault on the control power circuit feeding load 36. The resulting current imbalance sensed by differential current transformer 44 produces a ground fault signal in its secondary winding 48, which is processed by signal processor 50 in the same manner as though the ground fault existed on the power circuit downstream from ground fault sensor 24. With the issuance of a trip signal on lead 50a, thyristor SCR1 is triggered into conduction to draw energizing current through trip coil TC as well as light emitting diode LED. Contacts 54 are thus opened to clear the ground fault on the control power circuit, while light signal 70 issues to activate solid state switch 34 pursuant to initiating shunt tripping of power breaker 16. Since, in a typical application, secondary load 36 would constitute control and signalling components associated with the power circuit load 14, interruption of the power circuit in response to a ground fault on the control power circuit is appropriate.

While GFCI device 32 and shunt trip solenoid 22 are shown being energized from the same AC source 30, it will be appreciated that, by virtue of the electrical isolation afforded by the optical coupling between the GFCI device and solid state switch 34, they may be readily energized from separate sources.

It will be seen that the objects set forth above, among those made apparent in the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. A ground fault protection system for a power circuit including a source, a load and a power circuit breaker having contacts connected in series therebetween; said system comprising, in combination:
A. a sensor having a toroidal core embracing the conductors of the power circuit and a secondary winding on said core in which is developed a first ground fault signal indicative of a ground fault on the power circuit downstream from said core;
B. a control power source;
C. a current transformer having a primary winding connected in series with said secondary winding of said sensor and a secondary winding in which is developed a second ground fault signal proportional to said first ground fault signal;
D. a signal processor energized from said control power source and connected to said current transformer secondary winding for processing said second ground fault signal pursuant to developing a trip signal;
E. a first thyristor triggered into conduction by said trip signal to draw activating current from said control power source;
F. a light emitting device energized by said activating current to generate a light signal;
G. a shunt trip solenoid operatively coupled with the power circuit breaker and acting, when energized, to precipitate opening of the power circuit breaker contacts; and H. a solid state switch including
  (1) a silicon controlled rectifier connected in an AC energization circuit with said solenoid, said silicon controlled rectifier having anode, cathode and gate electrodes,
  (2) a full-wave diode rectifier bridge having a pair of input terminals and a pair of output terminals, said solenoid connected in said energization circuit in series with said bridge input terminals, said anode of said controlled rectifier connected to one bridge output terminal and said cathode of said controlled rectifier connected to the other bridge output terminal,
  (3) a first resistor interconnecting said cathode and gate electrodes of said controlled rectifier, and
  (4) a light activated device connected in series circuit with said first resistor across said bridge output terminals;
  (5) whereby said light activated device, in response to said light signal, draws current from said bridge through said first resistor to develop thereacross a gate voltage triggering said controlled rectifier in conduction to impose a low impedance path across said bridge output terminals pursuant to energizing said solenoid to precipitate opening of the power circuit breaker contacts.

2. The ground fault protection system defined in claim 1, wherein said solid state switch further includes
  (1) a capacitor, and
  (2) a second resistor connected with said capacitor in a series charging circuit across said bridge output terminals and in a series discharging with said light activated device.

3. The ground fault protection system defined in claim 2, which further includes a diode connected in said series charging circuit and poled to block said capacitor from discharging through said controlled rectifier.

4. The ground fault protection system defined in claim 1, wherein said control power source is an AC source having line and grounded neutral sides connected to feed a secondary load via respective line and neutral conductors, and said current transformer is a differential current transformer having a pair of primary windings individually connected in series with said line and neutral conductors, said sensor secondary winding connected in series relation with one of said differential current transformer primary windings, said system further including
  (1) contacts connected in said line conductor, and
  (2) a second trip solenoid operatively coupled with said contacts and connected in series relation with said first thyristor and said light emitting device across said line and neutral conductors,
  (3) whereby said activating current drawn from said control power source upon conduction of said first thyristor additionally energizes said second trip solenoid to precipitate opening of said contacts and thereby interrupt current flow in said line conductor.

5. The ground fault protection system defined in claim 4, wherein said solid state switch further includes
  (1) a capacitor, and
  (2) a second resistor connected with said capacitor in a series charging circuit across said bridge output terminals and in a series discharging with said light activated device.

6. The ground fault protection system defined in claim 5, which further includes a diode connected in said series charging circuit and poled to block said capacitor from discharging through said controlled rectifier.

* * * * *